April 12, 1966 E. CASSIDY ETAL 3,245,649
CABLE SECURING DEVICE
Filed Aug. 8, 1962 2 Sheets-Sheet 1
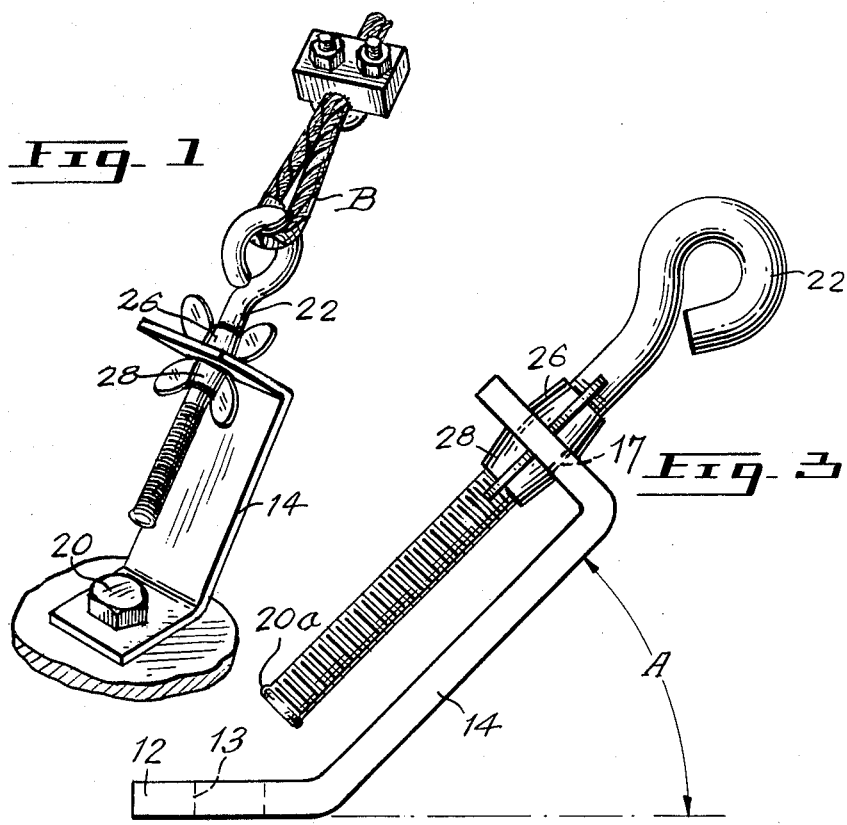
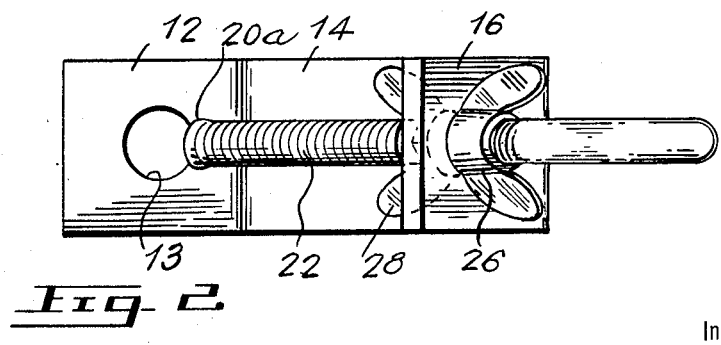
Inventors
Eric CASSIDY
Ernest J. HILTON
Attorney

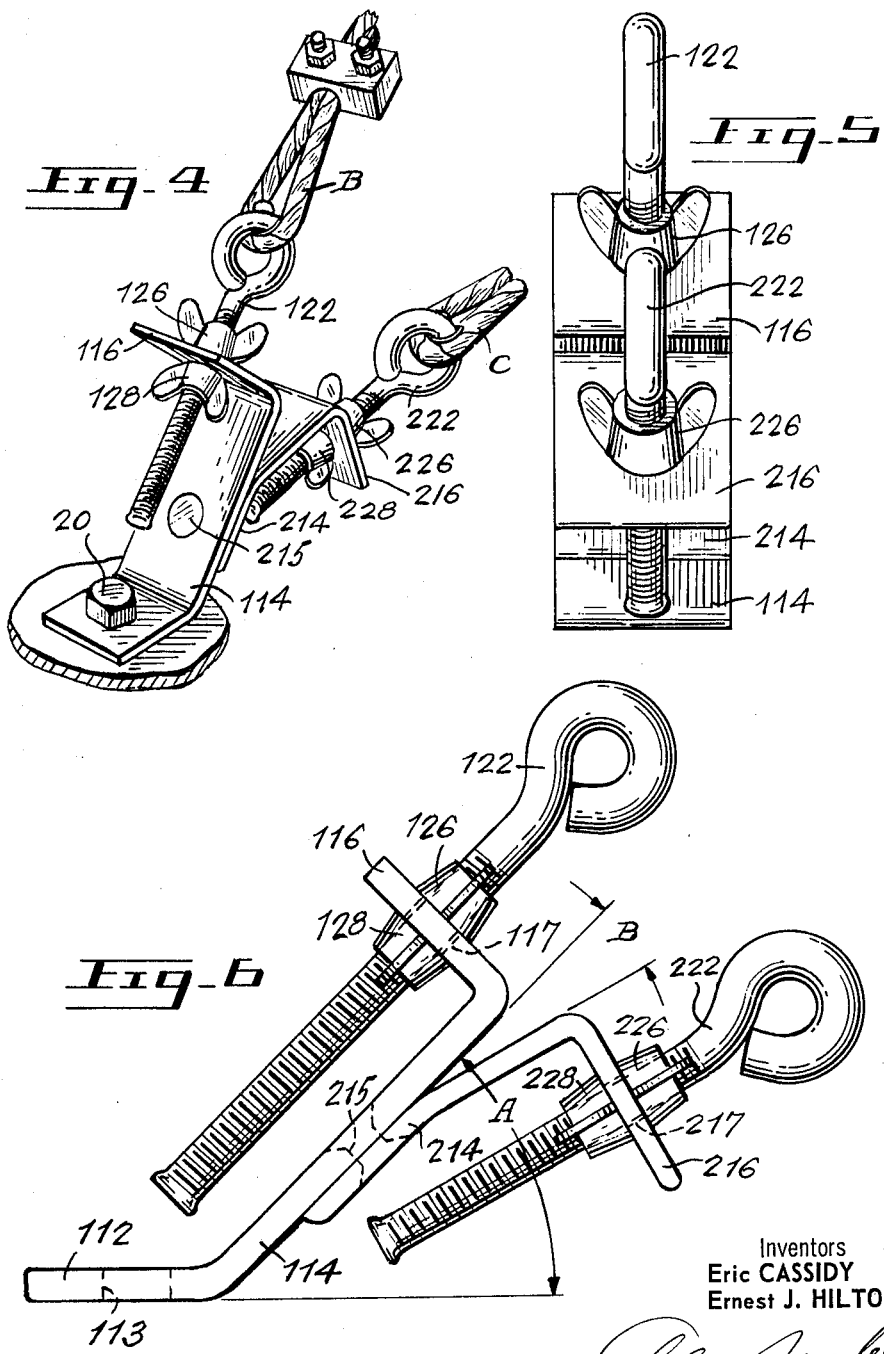

3,245,649
CABLE SECURING DEVICE
Eric Cassidy, Cap Sante, Quebec, Canada, and Ernest J. Hilton, 4750 Plamandon Ave., Montreal, Quebec, Canada
Filed Aug. 8, 1962, Ser. No. 215,749
2 Claims. (Cl. 248—361)

The present invention relates to improvements in the manufacture of cable or guy wire securing devices and more particularly to an improved construction of a cable securing device particularly suited for use with tension cables guying vertical structures such as signboards, television aerials or the like.

Vertical structures for example signboards as previously mentioned are usually guyed with stranded cables which extend from adjacent the top of the sign to a base support on each side so as to maintain the sign in the desired position against the forces of the wind and the weather. Usually, there is a base plate ring bolt or similar arrangement to which the bottom end of the cable is attached with a turnbuckle intermediate the length of the cable to permit adjustment of tension. Since most of the cable utilized for this purpose is of the twisted stranded type excess pressures against the guyed structure exerts a corresponding tension to the cable causing it to unwind applying a twisting torque which at times unscrews the turnbuckle permitting slack to an even failure of the supporting cable. There is also the problem that in order that the guy cables function at their highest efficiency opposing cables should extend from the sign or other structure at substantially the same angle. By this we mean, that if the cable at one side extends at say 45° from the structure to the base and the cable on the other side extends at say 30° the tension applied to the cables will vary greatly and therefore excessive strain is liable to be imposed on one cable causing possible failure.

The present invention recognizes these and other problems and aims to provide a solution to them by furnishing a cable securing device which includes adjustable cable attaching means which is not effected by twisting or torque pressures of the cable once adjusted and which, by reason of its formation, controls the angle of all cables attached thereto to substantially the same angle, preferably about 45°.

This is accomplished by making the device as a one piece main body having a first attachment portion suitably bored to accommodate a screw in bolt for attachment to a base, an elongated supporting portion extending angularly (preferably at 45°) upwards from the attachment portion and a ring bolt attachment portion extending inwardly at right angles to the angularly disposed portion. The ring bolt attachment portion is suitably bored to accommodate an elongated threaded ring bolt which is retained in position by a first retaining nut mounted on the bolt above the body portion and a second retaining nut mounted on the bolt below the body portion with the main length of the bolt extending towards the body attachment portion spaced from and parallel to the body angularly disposed portion. With this arrangement, when the attachment portion of the body is secured in a horizontal position to a suitable base, the supporting portion and ring bolt are positioned in an inclined position (45°) which is the line of the guying cable. The cable is attached to the ring bolt and tension adjustments made by first slackening off the top retaining nut and rotating the lower retaining nut drawing the bolt inwards against the pull of the cable. When the necessary tension is achieved the top retaining nut is run down locking the bolt in position against possible twisting from the cable under tension.

An alternative construction of a cable securing device according to the invention includes a supplementary supporting section which is attached to and extends diagonally outwards from the supporting portion of the main body. This structure is particularly suited for the guying of horizontally outstanding structures, for example, signs or the like extending outwardly from the face of a building. The supplementary supporting portion of the alternative construction is also provided with a ring bolt supporting portion extending at substantially right angles and in the opposite direction to the corresponding portion of the main body. The supplementary ring bolt supporting portion is bored as before to accommodate a second ring bolt which again is adjustably retained in position by retaining nuts above and below the attachment portion.

The second ring bolt extending in spaced relationship from the first ring bolt acts as an anchoring point for a second guying cable which is necessary in the supporting of horizontally extending structures over a certain length. The second guying cable is attached to the supported structure intermediate its length between the attachment point of the main guy and the anchoring base. With present double ring bolt arrangement it is a simple matter to secure the main body to the building or base, as previously described, and both main and supplementary guying cables anchored in an adjustable manner.

Having thus generally described the nature of the invention particular reference will be made to the accompanying drawings, and in which;

FIGURE 1 is a view in perspective elevation of a cable securing device in accordance with the invention as it would appear in operating condition.

FIGURE 2 is a view in top plan of the device shown in FIGURE 1 with the attachment screw and cable removed.

FIGURE 3 is a view in side elevation of the construction shown in FIGURE 2.

FIGURE 4 is an alternative form of a cable securing device in accordance with the invention as it would appear in operating condition.

FIGURE 5 is a view in top plan of the device shown in FIGURE 4 with the attachment screw and cables removed.

FIGURE 6 is a view in side elevation of the construction shown in FIGURE 5.

With particular reference to FIGURES 2 and 3 a preferred embodiment of a cable securing device according to the invention includes a one piece main body 10 of heavy gauge metal or the like, which is formed so as to have a substantially flat attachment portion 12, an elongated supporting portion 14 extending angularly upwards from the portion 12, and a bolt supporting portion 16. The attachment portion 12 is suitably bored as indicated at 13 to accommodate a hold down screw or bolt (for example as indicated at 20 in FIGURE 1) and the bolt supporting portion 16 is also suitably bored as indicated at 17 to accommodate an elongated ring bolt 22. The bolt 22 is adjustably retained on the device by a first retaining nut 26 located above the portion 16 and a second retaining nut 28 located below the portion 16. While the retaining nuts 26, 28 illustrated are wing nuts it will be appreciated that standard nuts can also be employed.

With this arrangement, the ring bolt 22 is retained with the main portion of its body spaced from and in parallel alignment with the angular supporting portion 14. The portion 14 is angularly disposed at an angle "A" from the attachment portion 12, and consequently the base to which it is attached, the angle "A" in the preferred construction being 45°. This means that the cable attachments to the present devices are all preferably arranged to be in alignment with this angle so that any tensions or stresses from the cable are transmitted along the axis of the bolt 22 and do not act to twist or distort the main supporting body.

As best shown in FIGURE 1, when the device is in use, the attachment portion 12 is fastened down by a screw or bolt 20 and the cable (indicated at "B") secured to the ring bolt 22. The top or first retaining nut 26 is slackened off and by rotation of the second retaining nut 28 the bolt 22 is drawn inwards applying the necessary tension. When this tension is achieved the first nut 26 is run down against the portion 16 so that the bolt 22 is locked against possible twisting movement by the cable. In the preferred construction illustrated and to prevent complete withdrawal of the bolt 22 in the event that it was inadvertently not locked as described, the lower terminal end 20a is enlarged or burred to prevent it from passing through the locking nut 28.

With particular reference to FIGURES 4, 5 and 6 an alternative construction of a cable securing device according to the invention includes a one piece main body 110 with a flat attachment portion 112, an elongated supporting portion 114 and a bolt supporting portion 116 as previously described. In addition, a supplementary supporting portion 214 is secured to the supporting portion by a countersunk headed bolt or rivet as indicated at 215 or alternatively by welding. The supporting portion 214 includes a bolt supporting portion 216 extending at substantially right angles and opposite to the main bolt supporting portion 116. As previously described, the bolt supporting portion 116, 216 are each bored at 117, 217 to accommodate elongated ring bolts 122, 222. The bolt 122 is retained on the device by retaining nuts 126, 128 while the bolt 222 is retained by retaining nuts 226, 228.

With this arrangement, the bolt 222 is retained with the main portion of its body spaced from and slightly at an angle relative to the bolt 122. The angle between the body portions 114, 214 (indicated at "B") will vary according to the required position of the second cable but it is preferably about 15° assuming the angle "A" is about 45° as previously described.

The double ring bolt arrangement is intended primarily for use to anchor both the main and auxiliary guy wires or cables supporting a horizontally extending structure although it will be appreciated that it can be used for any type of guying arrangement required anchorage of more than one cable disposed one above the other.

The attachment and adjustment of the cables indicated at "B" and "C" is the same as previously described. The retaining nuts 126, 226 are slackened off and the necessary tension applied through the nuts 128, 228 to the cables.

These arrangements provide simple, safe cable securing means that is particularly suited for use in the erection of signs, say on the tops of buildings or the like althrough it is also suitable for any and all uses wherein the adjustable tie down of cables or guy wires is necessary.

We claim:
1. An adjustable cable tensioning and anchoring device for imposing and maintaining a cable under tension, consisting in combination, a rigid body consisting of a planar base attachment portion having an opening therethrough for accommodating a hold down fastening for mounting the device on a support, an elongated planar supporting portion extending angularly and upwardly from one end of said base attachment portion, a planar bolt attachment portion extending upwardly and at a right angle from one end of said planar supporting portion, said bolt attachment portion having an opening therethrough, an elongated ring-bolt having an elongated threaded shank extending through said opening and an eye portion for connection to a cable to be retained under tension, the major portion of said shank extending downwardly in spaced parallel relation to the general plane of said planar supporting portion for permitting adjustment of tension and insuring transmittal of tensile forces to said supporting portion without excessive torque being imposed on other portion of said rigid body, a pair of retaining nuts threadably engaged on said shank on opposite sides of said bolt attachment portion, said supporting portion being of a sufficient length to accommodate substantially the entire length of said bolt beneath said bolt attachment portion, and a second elongated supporting portion having a first part secured to an intermediate part of said first-mentioned supporting portion and having a second part extending angularly and downwardly therefrom, a second planar bolt attachment portion extending away from said first invention both attachment portion, at right angles from the terminal end of said second part and a second elongated ring-bolt having a threaded shank extending through and adjustably engaged on said second bolt attachment portion and disposed parallel to said second part.

2. The structure as claimed in claim 1 in which said first-mentioned supporting portion is disposed at substantially 45° with respect to said base attachment portion, said second part being disposed at substantially 15° with respect to the first-mentioned supporting portion.

References Cited by the Examiner
UNITED STATES PATENTS

| | | | |
|---|---|---|---|
| 455,424 | 7/1891 | Westway | 52—656 |
| 1,178,641 | 4/1916 | Henkel | 52—151 |
| 1,690,955 | 11/1928 | Stouffiet | 52—149 |
| 2,296,086 | 9/1942 | Bunker | 52—155 |
| 2,580,960 | 1/1952 | Sato | 256—56 |
| 2,787,476 | 4/1957 | Holsclaw | 248—361 X |

FRANK L. ABBOTT, *Primary Examiner.*

RICHARD W. COOKE, JR., *Examiner.*